United States Patent
Moisy et al.

(10) Patent No.: US 6,913,699 B2
(45) Date of Patent: Jul. 5, 2005

(54) PROCESS FOR SELECTIVELY REMOVING FUNCTIONALIZED ORGANIC COMPOUNDS FROM A LIQUID MEDIUM

(76) Inventors: Philippe Moisy, 7, rue des Ilinies, F-30 000 Nimes (FR); Pierre Blanc, 30 Impasse des Coffitis, 30133 Les Angles (FR); Frédérique Rey-Gaurez, 90 ter Avenue de la Gare, 91300 Massy (FR); Sergey Nikitenko, Oktyabrskaya Str., 57/2, ap. 15, Ilinsky Moscow Region (RU)

( * ) Notice: Subject to any disclaimer, the term of this patent is extended or adjusted under 35 U.S.C. 154(b) by 147 days.

(21) Appl. No.: 10/153,862

(22) Filed: May 24, 2002

(65) Prior Publication Data

US 2003/0080070 A1 May 1, 2003

(30) Foreign Application Priority Data

May 29, 2001  (FR) ............................................. 01 06982

(51) Int. Cl.[7] ............................. B01J 19/10; B01D 1/36
(52) U.S. Cl. ...................... 210/748; 210/903; 210/906; 210/908; 204/157.15
(58) Field of Search ................................. 210/748, 758, 210/903, 906, 908; 261/DIG. 48; 204/157.15, 158.2; 585/800, 868

(56) References Cited

U.S. PATENT DOCUMENTS

| | | | |
|---|---|---|---|
| 4,045,336 A | | 8/1977 | Isteri |
| 4,076,617 A | * | 2/1978 | Bybel et al. ................. 210/748 |
| 4,369,100 A | * | 1/1983 | Sawyer ................... 204/157.42 |
| 5,658,534 A | * | 8/1997 | Desborough et al. ....... 422/128 |
| 5,885,424 A | * | 3/1999 | Davis et al. ........... 204/157.42 |
| 6,077,431 A | * | 6/2000 | Kawanishi et al. ......... 210/609 |
| 6,245,241 B1 | * | 6/2001 | Kupczik et al. ............ 210/759 |
| 2002/0108846 A1 | * | 8/2002 | Davydov et al. ........ 204/158.2 |
| 2003/0051988 A1 | * | 3/2003 | Gunnerman et al. ... 204/157.15 |
| 2003/0062321 A1 | * | 4/2003 | Kitayama et al. ........... 210/748 |

FOREIGN PATENT DOCUMENTS

| | | | |
|---|---|---|---|
| JP | 56081112 | | 7/1981 |
| JP | 58052599 | | 3/1983 |
| JP | 11300334 | | 11/1999 |
| JP | 11-300334 A | * | 11/1999 |

* cited by examiner

*Primary Examiner*—Frank M. Lawrence

(57) ABSTRACT

The present invention is directed to a process and device for selectively removing at least one functionalized organic compound present in a liquid medium. More specifically the present invention is useful for removing functionalized organic compounds, that may accumulate in the mixture of extractant and diluent, used in processes for reprocessing nuclear fuel or processes for cleaning and decontaminating nuclear power plants.

20 Claims, 2 Drawing Sheets

PROCESS FOR SELECTIVELY REMOVING FUNCTIONALIZED ORGANIC COMPOUNDS FROM A LIQUID MEDIUM

This application claims priority under 35 U.S.C §§ 119 and/or 365 to No. 01 06982 filed in France on May 29, 2001; the entire content of which is hereby incorporated by reference.

BACKGROUND OF THE INVENTION

Field of the Invention

The present invention relates to a process and a device for selectively removing functionalized organic compounds from a liquid medium.

The present invention is especially for removing functionalized organic compounds, which may accumulate in the extracting and diluting medium, used in processes for reprocessing nuclear fuel or processes for cleaning and decontaminating nuclear power plants.

The technical field of the invention may be defined as that of removal of functionalized organic compounds, which are in a liquid medium, without the other constituents of the liquid medium, such as the solvent, themselves being affected, i.e. degraded or destroyed.

BACKGROUND

Among the organic compounds to be removed, some have a stability such that it leads to high-energy destruction reactions, posing serious problems of process safety. The most widely known of these compounds are alkyl nitrates, the conditions for explosivity of which are readily achieved.

The destruction of organic compounds occasionally requires high temperatures and pressures, which imposes constraints on the plants used and involves a large consumption of energy.

Finally, fundamentally, the selectivity of these reactions is often mediocre and, as a result, there is large degradation of the liquid medium in which the organic compounds are present, leading to the formation of novel compounds that need to be removed in a further step.

None of the techniques used hitherto, for the purposes of removing organic compounds present in a liquid medium, such as a solvent, is satisfactory.

In other words, no chemical and/or physical treatment exists for selectively removing functionalized organic compounds from a liquid medium.

In the light of the text hereinabove, it is thus seen that there is an unsatisfied need for a selective process for removing functionalized organic compounds present in a liquid medium.

The aim of the present invention is, inter alia, to provide a process for removing functionalized organic compounds present in a liquid medium, which satisfies this need.

The aim of the present invention is also to provide such a process, which does not have the drawbacks, limitations, defects and disadvantages of the prior art chemical and/or physical treatments and which is, moreover, selective as regards the removal of these organic compounds.

This aim and others are achieved in accordance with the invention by a process for selectively removing functionalized organic compounds present in a liquid medium, in which a stream of gas is circulated in the liquid medium and the liquid medium is simultaneously subjected to the action of ultrasonic waves.

SUMMARY OF THE INVENTION

The process according to the invention consists in subjecting the liquid medium to an ultrasonic field which produces a cavitation phenomenon and results in implosion of the cavitation bubbles. The organic compounds are thus removed "sonochemically", i.e. the energy supplied to the system to carry out the reactions, leading to the removal of the organic compounds, is due to the cavitation phenomenon obtained during the irradiation of the medium with an ultrasonic wave.

According to the invention, simultaneously with the action of ultrasound, a stream of gas is circulated in the liquid medium. It is precisely the combination, which may be termed "synergistic", of the action of the ultrasound and the circulation of the gas that leads to a selective removal of the functionalized organic compounds, i.e. without the constituents of the liquid medium, such as a solvent, other than the functionalized organic compounds to be removed, being in any way affected, degraded or destroyed.

The circulation of the gas is conducive to cavitation and to evacuating the compounds to be removed, and also the gases derived from the decomposition of the functionalized organic compounds to be destroyed.

For the first time, and by virtue of the combination of the action of ultrasound and the circulation of the gas, according to the process of the invention, the selective removal of functionalized organic compounds present in a liquid medium is possible, and in a high yield.

In other words, the process of the invention allows the selective removal of functionalized compounds, relative to the other constituents of the liquid medium, for example an extractant-diluent pair. The process has many advantages. Inter alia, its selectivity allows the removal of the target compounds without degrading the reaction medium, for example the liquid or gaseous medium, which may be reused subsequently in the industrial process, and without forming novel compounds that would again need to be destroyed.

The process according to the invention is highly efficient since a quantitative removal of organic compounds in the form of gaseous compounds, which present no difficulties for their subsequent management, may be obtained.

Specifically, these compounds are evacuated from the medium under the combined, synergistic effect, according to the invention, of the ultrasonic wave and the circulation of a flow of gas.

The functioning of the process according to the invention does not require the addition of additional reagents. The reason for this is that the energy transmitted by the ultrasonic field is directly supplied to the reaction in the form of heat and pressure in the cavitation bubble.

The process according to the invention is very safe since the energy potential accumulated, for example in the reactor in which it takes place, is low, given the localization of the reaction in the cavitation bubble. Specifically, the high temperatures and pressures obtained in the cavitation bubble when it implodes are localized solely in these bubbles, which are small in size.

Furthermore, the process according to the invention generally does not require the use of high pressures and/or temperatures, which is an important asset in many respects, such as the safety and the possibility of using standard plants in a radioactive environment.

The invention also relates to a device for selectively removing functionalized organic compounds present in a liquid medium, comprising a chamber containing the said liquid medium, means for circulating a stream of gas in the said liquid medium, and means for simultaneously subjecting the said-liquid medium to the action of ultrasonic waves.

Other characteristics and advantages of the invention will emerge more clearly from the description that follows, which is given as a non-limiting illustration with reference to the attached drawings, in which:

DETAILED DESCRIPTION OF THE INVENTION

Figure 1:
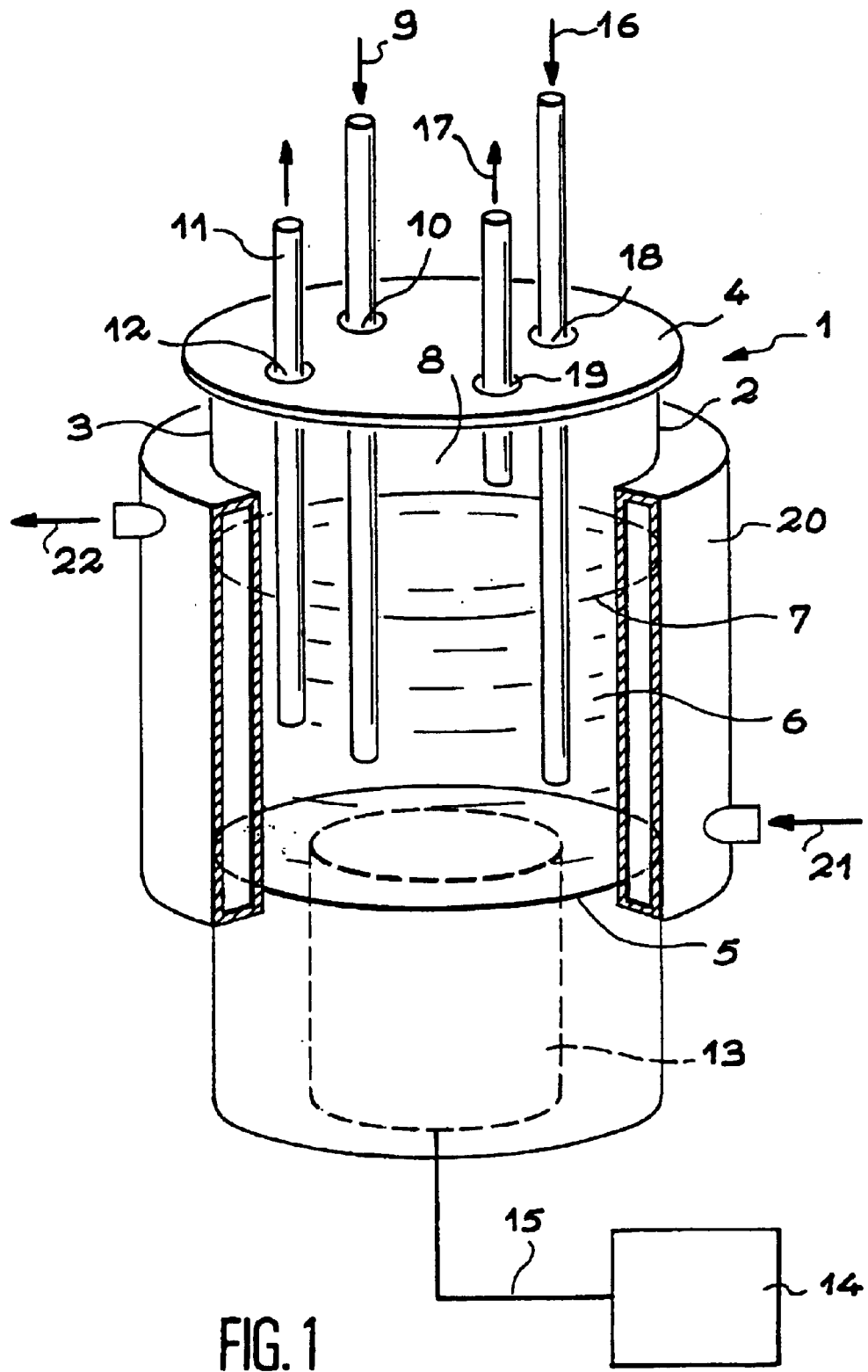
FIG. 1 is a diagrammatic perspective view of a device of the invention.

In further detail, according to the process of the invention, the organic compounds present in a liquid medium are selectively removed by means of the combined action of ultrasound and a stream of gas that may be termed "a stream of vector gas". One of the important parameters for controlling the selectivity of the reaction leading to the destruction, degradation and removal of functionalized organic compounds is the difference in vapour pressure existing between the majority constituent of the liquid medium and the organic compound(s) to be removed.

Preferably, according to the invention, the vapour pressure of the organic compound(s) to be removed is thus different from the vapour pressure of the majority constituent of the liquid medium. More preferably, this vapour pressure is greater than that of the majority constituent of the liquid medium.

Another important parameter for controlling the selectivity of the reaction, leading to the removal of the organic compounds, is the aptitude to salvation of these compounds.

The phenomenon that leads to the selective removal of organic compounds, for example in the form of solutes in a solvent, is based on the phenomenon of cavitation induced by the transmission of an ultrasonic wave in a liquid-gas two-phase medium. Specifically, the final step of the cavitation phenomenon is an implosion that leads locally, i.e. in the cavitation bubble, to colossal temperatures and pressures, that may be up to several thousand degrees and several hundred atmospheres.

Thus, the compounds, for example the solutes, which are contained in the cavitation bubble or close to it during the implosion, are subjected to extreme temperature and pressure conditions. Under these conditions, the solutes, for example mineral or organic solutes, are decomposed via a homolytic bond cleavage reaction or by thermolysis.

Moreover, it should also be noted that the exchange of matter between the inside of the cavitation bubble and the liquid medium, such as a solution, is governed by the laws of diffusion (Fick's Laws). That is to say that the diffusion of a compound, such as a solute, is controlled firstly by its physicochemical characteristics (for instance the vapour pressure, the molar volume, the degree of salvation, etc.) and secondly by the difference in concentration between the two areas in which there is diffusion. Thus, during the cavitation phenomenon, which is a sequence of compressions and dilations of the cavitation bubble, the compound, such as a solute, can become accumulated and concentrated in the cavitation bubble.

The selective removal of the compounds, for example solutes, leads predominantly to the production of gaseous products, which will be removed by the stream of gas used in the process of the invention, of non-functionalized alkyls and water. The gaseous products are, for example, oxygen, carbon dioxide, nitrogen, nitrogen oxides, hydrogen or the molecule itself diluted in the vector gas.

It is possible to control the temperature and pressure in the cavitation bubble, during the implosion, firstly by means of the type of vector gas used and the temperature and pressure in the chamber in which the treatment takes place, and secondly by means of the sonochemical conditions imposed, which are especially the frequency and the intensity of the ultrasonic flow.

According to the invention, the liquid medium to be treated is subjected to the temperature T and the pressure P at an ultrasonic flow of frequency f and of intensity I, while a stream of gaseous vector gas, with a flow rate D, simultaneously circulates in the liquid medium.

It has been seen that this stream of gas makes it possible both to amplify the cavitation phenomenon and to remove and evacuate the gaseous products from the liquid medium.

The criterion of choice for these various parameters is the increase in the decomposition kinetics of the organic compound(s), without losing the selectivity of the reaction leading to the removal of these compounds.

According to the invention, ultrasound with a frequency f from 15 kHz to 1.5 MHz is generally used.

The acoustic intensity of the ultrasound, which is measured, for example, by a calorimetric measurement related to the area of the ultrasonic source, is generally from 1 W.cm$^{-2}$ to 20 W.cm$^{-2}$.

The flow rate of the stream of gas or vector gas is generally from 10 to 600 ml.min$^{-1}$.

The vector gas is generally chosen from rare gases, such as helium, neon or argon; air; and mixtures thereof.

The process according to the invention is generally performed, for example, at a pressure and temperature of from 10 to 100° C. and from 1 to 10 bar, respectively.

Preferably, the process according to the invention is performed at atmospheric pressure and at ambient temperature, for example in the region of 20° C.

The functionalized organic compounds that are removed by the process of the invention are compounds comprising at least one chemical function. The process according to the invention makes it possible to remove any functionalized organic compound, irrespective of the type of function(s) that this compound comprises.

In general, the functionalized organic compound(s) (generally termed "solute(s)") comprise(s) at least one function chosen from functions comprising at least one atom chosen from nitrogen, oxygen, sulphur and phosphorus atoms and halogen atoms, such as chlorine, bromine, iodine and fluorine.

The rest of the molecule of the functionalized organic compounds, apart from the function, generally consists essentially of hydrogen and carbon atoms.

The said function may thus be chosen especially from any function known in organic chemistry, for instance carboxylic acid, sulphonic acid, phosphoric acid, anhydride, ester, acid halide, amide, nitrite, aldehyde, ketone, alcohol, thiol, amine, ether, organic nitrite, organic nitro and organic nitrate functions, and halide functions.

It should be noted that the process according to the invention allows the safe treatment of unstable compounds, such as alkyl nitrates.

The liquid medium to be treated may be a one-phase medium, for example an organic or aqueous medium, but it may also be a multi-phase medium, for example a two-phase medium, consisting, for example, of an organic phase and an aqueous phase.

The organic and/or aqueous phase may also comprise other compounds, such as nitric acid or metal nitrate salts.

The organic phase may essentially comprise an organic solvent.

In the preferred application of the process according to the invention, the solvent consists essentially of an extractant-diluent mixture, used in processes for reprocessing nuclear fuel or processes for cleaning, decontaminating nuclear plants.

The extractants are chosen, for example, from alkyl phosphates, such as tributyl phosphate (TBP) and alkylamides.

The diluents are chosen, for example, from alkanes, such as dodecane, alcohols and carboxylic acids.

A typical organic phase for the liquid medium to be treated, according to the invention, will consist, for example, of TBP in a diluent, preferably an aliphatic diluent such as hydrogenated tetrapropylene (HTP) or dodecane.

In media consisting of the extractant-diluent mixtures mentioned above, the functionalized organic compounds to be removed are compounds essentially formed, after chemical degradation reactions—in particular hydrolysis or radiolysis—from the extractants, diluents, nitric acid and metal nitrate salts. These compounds are thus, for example, alkyl nitrates.

The liquid medium to be treated may be a solution or an aqueous or organic suspension. In the case of a solution, the functionalized organic compounds to be removed are obviously termed "solutes".

Finally, the process according to the invention may be performed in continuous mode or in batch mode.

The device according to the invention, described in FIG. 1, essentially comprises a reactor (1), also known as a "sonoreactor" or "sonochemical reactor".

This reactor is, in FIG. 1, in the form of a straight cylinder that has side walls (2, 3), a lid, which is preferably removable (4), and a base (5). Inside this cylindrical chamber is the solution to be treated (6), the upper level (7) of which is generally below the plane of the lid (4), so as to create a free space (8) between the level of the solution and the lid.

The solution to be treated containing the structures, the chemical molecules to be degraded, to be removed, is introduced into the reactor via the pipe (9) which passes through the lid at (10). In the case of continuous functioning of the reactor, the solution to be treated then circulates in the reactor and leaves it via the pipe (11) which passes through the lid at (12).

It is clear that, in the case of batch functioning, the solution to be treated does not circulate in the reactor, but is introduced therein via the pipe (9), until the adequate level is reached, and is removed therefrom when the treatment has ended.

It should be noted that the solution to be treated, which may be an effluent, may have been brought to the required temperature and pressure beforehand.

In accordance with the invention, the reactor is equipped with means for generating and transmitting ultrasound, or ultrasonic waves, in the solution to be treated. These means for transmitting ultrasound consist, in FIG. 1, of an ultrasonic wave emitter (13) placed, for example, under the base of the reactor. This ultrasound or ultrasonic wave emitter (13) serves to transmit to the solution the ultrasonic waves generated by a generator (14), connected via a cable or wire (15).

According to the invention, means are also provided for circulating a vector gas in the reactor and in the solution. These means comprise an inlet and an outlet in the form of pipes (16, 17) which pass through the lid at (18, 19), so as to introduce a gas, known as the "vector gas", into the solution and to circulate it in the reactor, and then to remove it. These means also generally comprise a pump and means for measuring and controlling the flow rate of vector gas. The vector gas leaving the reactor via the pipe (17) is generally charged with the compounds to be removed by the action of ultrasound.

The gas leaving the reactor is thus then treated in means (not shown), such as a filter, to free it of the compounds it contains and to purify it for the purpose of possible recycling.

The temperature of the solution is preferably kept constant by temperature-regulating means that are, in FIG. 1, in the form of a jacket (20) or sleeve provided around the walls of the cylinder and in which circulates a heat-exchange fluid introduced at (21) and leaving at (22).

In the case of use under pressure, it is prudent to provide sealing means to close the sonoreactor.

The volume of the reactor is especially chosen as a function of the volume or flow rate—in the case of continuous functioning—of the solution to be treated, and also of the capacities of the generator to provide a sufficient ultrasonic intensity.

The invention will now be described with reference to the examples that follow, which are given as non-limiting illustrations.

EXAMPLES

Example 1

Decomposition of Organic Nitrite Compounds (RONO)

Examples (1a to 1e) below relate to the sonolysis in dodecane or pure TBP medium (reaction medium) of three isomers of butyl nitrite ($C_4H_9ONO$, written as BuONO), namely: n-butyl nitrite, written n-BuONO, isobutyl nitrite, written i-BuONO, and tert-butyl nitrite, written t-BuONO.

Examples (1a to 1e) study, respectively, the stability of the reaction medium, the effect of the concentration and boiling point of the solute, and the frequency of the ultrasound, and the gas flow during the sonolysis.

Example 1a

Stability of the Reaction Medium

In this example, an organic TBP (tributyl phosphate) solution is used pure, or TBP placed in contact beforehand with water, or TBP diluted to 30% in dodecane or n-octane.

This solution (V=100 ml at 45° C.) is subjected to an ultrasonic flow (f=20 kHz; I=3.5 W.cm$^{-2}$) and the amount of TBP decomposed during the sonolysis time is measured.

Irrespective of the composition of the solution, the amounts of TBP decomposed increase as the sonolysis time increases. The linear variation of the accumulation of decomposition product as a function of time (for a sonolysis time of less than 100 minutes) shows that the kinetics are zero order kinetics and made it possible to evaluate the decomposition rates indicated in Table 1.

TABLE 1

| Medium | Pure TBP | TBP pre-equilibrated with water | TBP diluted to 30% in dodecane | TBP diluted to 30% in n-octane |
|---|---|---|---|---|
| Kinetic constant $\mu$mol · min$^{-1}$ | 26 | 15 | 5 | Less than 2 | f = 20 kHz; I = 3.5 W · cm$^{-2}$; V = 100 ml; T = 45° C.

In this example, the known decomposition products of TBP were identified: dibutyl phosphate (DBP), monobutyl phosphate (MBP) and phosphoric acid.

In the case of pure TBP, the rates of formation were evaluated for DBP and the mixture MBP+$H_3PO_4$, respectively, of the order of 4.2 $\mu$mol.min$^{-1}$ and 8.5 $\mu$mol.min$^{-1}$, i.e. a total rate of formation of degradation products of the order of 13 $\mu$mol.min$^{-1}$.

Furthermore, it was observed that TBP redox degradation products (change in the degree of oxidation of the phosphorus) accumulate in solution up to a limit concentration, and then evaporate off. The kinetics of formation of redox products was evaluated as being of the order of 13 $\mu$mol.min$^{-1}$ for a duration of less than 100 min. A slowing-down of the rate of formation of reduced products was observed for durations of greater than 100 min.

In total, the rate of decomposition of pure TBP is evaluated as being 26 $\mu$mol.min$^{-1}$ (Table 1).

In the case where the TBP was initially pre-equilibrated with water, the rate of decomposition of the TBP is lower and is of the order of 15 $\mu$mol.min$^{-1}$ (Table 1).

Moreover, it should be noted that the dilution of TBP (for example to 30%) in an alkane (dodecane or n-octane) leads to a reduction in the rate of decomposition of the TBP by 5 $\mu$mol.min$^{-1}$ and less than 2 $\mu$mol.min$^{-1}$, respectively (Table 1).

Moreover, it should be noted that, in the case where the TBP was pre-equilibrated with an aqueous nitric acid phase, the rate of decomposition is markedly reduced and that no TBP reduction products are formed.

For example, under identical conditions, the rate of decomposition of TBP, in pure form or diluted to 30% in dodecane pre-equilibrated with 4 M $HNO_3$, is 10 $\mu$mol.min$^{-1}$ or 3 $\mu$mol.min$^{-1}$, respectively.

Moreover, the monitoring in the gaseous flow leaving the sonoreactor, of the products of sonolysis of a two-phase system consisting of 50 ml of TBP, diluted to 30% in dodecane, and 50 ml of 4 M nitric acid, under sonochemical conditions similar to the conditions described above, shows that the composition of the gaseous phase is the sum of that observed during the sonolysis of $HNO_3$ (mainly NO and $NO_2$) and of the diluent (mainly $CH_4$, $C_2H_4$, $C_2H_6$ and $C_2H_2$), and also comprises products of reaction of these compounds with each other (in particular CO and $CO_2$).

Furthermore, it should be noted that no formation of compound of the organic nitrate or nitrite type was observed, but there was accumulation of nitrous acid in the reaction medium, which is the product of the sonolysis of nitric acid.

Example 1b

Effect of the Concentration

During the sonolysis (f=20 kHz, I=2.5 W.cm$^{-2}$, T≅30° C.) of n-butyl nitrite (n-BuONO) (about 0.40 M) in TBP and dodecane medium, the n-BuONO concentration decreases linearly with time (zero-order kinetics). The kinetic constants evaluated under these conditions are listed in Table 2.

On the other hand, in the case where the initial n-BuONO concentration is lower (0.04 M), the disappearance kinetics are first order kinetics. Table 2 collates the kinetic constants evaluated under similar sonochemical conditions.

TABLE 2

| Medium | TBP | Dodecane | TBP | Dodecane |
|---|---|---|---|---|
| Initial concentration (M) | 0.41 | 0.41 | 0.041 | 0.041 |
| Kinetic order | 0 | 0 | 1 | 1 |
| Kinetic constant | 0.3 mmol · min$^{-1}$ | 0.2 mmol · min$^{-1}$ | 0.025 min$^{-1}$ | 0.012 min$^{-1}$ |
| Boiling point | 284° C. | 216° C. | 284° C. | 216° C. | f = 20 kHz; I = 2.5 W · cm$^{-2}$; V = 100 ml; T = 32° C.

Firstly, it should be noted that the rates of removal are higher in pure TBP medium than in dodecane medium. Moreover, in a medium of 20% ethanol in water, and for a low concentration of n-BuONO (0.041 M), a disappearance rate constant (first order) of the order of 0.01 min$^{-1}$ was observed, which confirms the effect of the medium on the rate of removal.

Secondly, exploitation of these kinetic constants makes it possible to compare the amount of n-BuONO removed over 100 min. In TBP medium: for a low concentration of n-BuONO, about 3.85 mmol are consumed, whereas for a higher concentration, 14.5 mmol are consumed. Thus, it appears that the higher the concentration, the higher the rate of disappearance. By comparison with the results of Example 1a, it should be noted that over 100 min, only 0.26 mmol of TBP is removed during the sonolysis of pure TBP.

Example 1c

Effect of the Boiling Point

During the sonolysis (f=20 kHz, I=2.5 W.cm$^{-2}$, T≅30° C.) of n- and i-BuONO (0.04 M to 0.03 M, respectively) in pure TBP medium (b.p.=284° C.), the disappearance of these two isomers was observed. The results and boiling points are listed in Table 3.

TABLE 3

| BuONO | Kinetic order | Kinetic constant (min$^{-1}$) | Half-reaction time (min) | Boiling point (° C.) |
|---|---|---|---|---|
| n-BuONO | 1 | 0.025 | 27.7 | 78 |
| i-BuONO | 1 | 0.037 | 18.7 | 66 | f = 20 kHz; I = 2.5 W · cm$^{-2}$; V = 100 ml; T 32° C.

From these results, it should be noted that the decrease in boiling point of the compound to be removed increases the rate of disappearance during sonolysis.

In dodecane medium (b.p.=216.2° C.), the same effect was observed under relatively similar sonochemical conditions (f=20 kHz; I=3.4 W.cm$^{-2}$; V=50 ml; T=20° C.). The kinetic constants are listed in Table 4.

TABLE 4

|  | n-BuONO | i-BuONO | t-BuONO |
|---|---|---|---|
| Boiling point | 78° C. | 66° C. | 62° C. |
| Dodecane | 0.024 | 0.054 | 0.091 |

$f = 20$ kHz, $I = 3.3$ W · cm$^{-2}$, T ≅ 20° C.

Example 1d
Effect of the Ultrasonic Frequency

The results concerning the sonolysis of the three isomers n-BuONO, i-BuONO and t-BuONO in dodecane medium during sonolysis at a frequency of 20 and 500 kHz (T=20° C.) are listed in Table 5.

TABLE 5

| Isomer | n-BuONO | | i-BuONO | | t-BuONO | |
|---|---|---|---|---|---|---|
| BuO—NO bond energy (at 298 K) | 177.8 kJ · mol$^{-1}$ | | 175.7 kJ · mol$^{-1}$ | | 171.1 kJ · mol$^{-1}$ | |
| Boiling point | 78° C. | | 66.5° C. | | 62° C. | |
| Kinetics | k (10$^{-2}$ min$^{-1}$) | t$_{1/2}$ (min) | k (10$^{-2}$ min$^{-1}$) | t$_{1/2}$ (min) | k (10$^{-2}$ min$^{-1}$) | t$_{1/2}$ (min) |
| 20 kHz (I = 3.33 W · cm$^{-2}$) | 2.42 | 29 | 5.39 | 13 | 9.12 | 8 |
| 500 kHz (I = 3.06 W · cm$^{-2}$) | 0.163 | 425 | 0.299 | 231 | 0.287 | 179 |

These results reveal that the removal of BuONO is faster at a frequency of 20 kHz than at 500 kHz. Moreover, it should be noted that at 20 kHz and 500 kHz, the kinetic constants decrease when the boiling point or the BuO—NO bond energy increases, which confirms the results collated in Tables 3 and 4.

Example 1e
Effect of the Gas Flow

In this example, the effect of the flow of vector gas is observed during the sonolysis of n-BuONO at 20 kHz.

To do this, monitoring is performed in solution and in a trap located at the reactor outlet, either without or with a stream of argon at two temperatures (24° C. and 30° C., respectively) during the sonolysis. The results are listed in Table 6.

TABLE 6

|  | Total removed | Accumulation in the trap | Destruction by sonolysis | Kinetic constant k |
|---|---|---|---|---|
| With flow of Ar 10 L · h$^{-1}$/ 24° C. | 86.5% | 17.4% | 69.1% | 2.67 10$^{-2}$ min$^{-1}$ (26 min) |
| Without flow of Ar 24° C. | 54% | 1.9% | 52% | 1.36 10$^{-2}$ min$^{-1}$ (51 min) |
| With flow of Ar 10 L · h$^{-1}$/ 30° C. | 99.6% | 12.4% | 87.2% | 3.46 10$^{-2}$ min$^{-1}$ (20 min) |

$f = 20$ kHz; [n-BuONO] initial $= 4 \times 10^{-2}$ M; dodecane medium; t = 20 min; I = 1.66 W · cm$^{-2}$.

These results reveal, firstly, that the use of a flow of gas promotes the destruction of n-BuONO by sonolysis, and secondly that the removal of the product to be destroyed is promoted by the flow of gas.

It was also observed that an increase in the temperature of the solution increases the kinetics of removal of n-BuONO during sonolysis with a stream of argon.

Furthermore, it was confirmed that the sonolysis product is not NO$_2$, but probably NO, which is a standard product of thermolysis of BuONO.

Example 2
Decomposition of An Organic Iodo Compound (RI)

The effect of ultrasound during the sonolysis of n-iodobutane (n-BuI), the boiling point of which is of the order of 130° C., is studied in this example.

Example 2a
Effect of the Ultrasonic Frequency

Table 7 collates the results obtained with this compound in dodecane medium during sonolysis at 20 kHz and at 500 kHz.

TABLE 7

|  | Boiling point | 20 kHz | 500 kHz |
|---|---|---|---|
| K (10$^{-2}$ min$^{-1}$) n-BuI | 130° C. | 0.22 | 0.14 |
| K (10$^{-2}$ min$^{-1}$) n-BuONO | 78° C. | 2.15 | 0.14 |

These results show that the removal of n-iodobutane by sonochemistry in dodecane medium is effective in dodecane medium, which is not the medium that is the most favourable for the desired effect.

Moreover, the analytical monitoring of the "traps", for collecting the compounds obtained from the sonoreactor and conveyed by the vector gas, made it possible to confirm that all of the iodobutane destroyed during the sonolysis is removed, and then trapped in the form of I$_2$, a non-interfering, volatile species.

Example 2b
Influence of the Flow Rate of Vector Gas

This example relates to the influence of the flow rate of vector gas on the kinetics of removal of iodobutane (Table 8). Specifically, given the decomposition of iodobutane to volatile iodine (I$_2$), an increase in the rate of removal of I$_2$ must lead to an increase in the rate of decomposition of n-BuI.

TABLE 8

| Flow rate (L · h$^{-1}$) | 10 | 30 |
|---|---|---|
| K (10$^{-3}$ min$^{-1}$) | 2.76 | 3.23 |

$f = 20$ kHz; T = 50° C.; Ar.

Although small, it appears that an increase in the flow rate of gas increases the kinetics of removal of n-BuI.

Furthermore, a qualitative analysis of the composition of the trap shows that the amount of n-BuI removed in the trap without decomposition is markedly less than 10% of the amount destroyed.

Given the mechanism of decomposition of n-BuI, i.e. homolytic cleavage of the carbon-iodine bond, it is probable that the recombination of the two iodine radicals results in the formation of $I_2$, which is volatile in the reaction medium.

Example 3
Decomposition of Organic Nitro Compounds ($RNO_2$)

The results of the sonochemical removal of two nitrobutane isomers (n-$BuNO_2$ and t-$BuNO_2$), characterized by boiling points that are markedly higher than those of the nitrite or iodo compounds, are studied in this example (Table 9).

Under unfavourable conditions: low concentration (of about $5 \times 10^{-1}$ M), in dodecane medium, and at a frequency of 500 kHz, sonolysis leads to the removal of the two isomers.

TABLE 9

| Compound | n-isomer | | | t-isomer | |
|---|---|---|---|---|---|
| | n-$BuNO_2$ | n-BuI | n-BuONO | t-$BuNO_2$ | t-BuONO |
| Boiling point | 152° C. | 130° C. | 78° C. | 126° C. | 62° C. |
| K (500 kHz) ($10^{-3}$ $min^{-1}$) | 0.81 | 1.59 | 1.63 | 1.63 | 3.87 | dodecane medium; I ≈ 3 W · $cm^{-2}$; T = 20° C.

Under the conditions selected for this example, it should be noted that the removal of the two isomers, although slower than that of the nitrite compounds (by a factor of about 2), is appreciable.

Figure 2A:
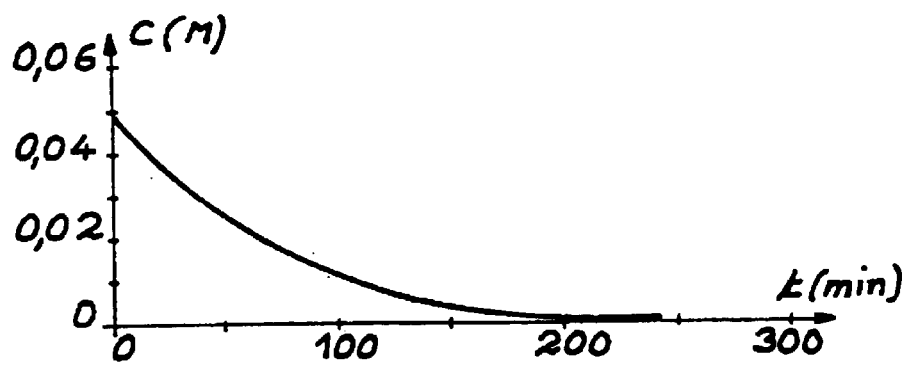
FIG. 2A is a graph showing the variation in the concentration C (in M) of tert-butyl nitrite (t-BuNO$_2$) (initial concentration $4 \times 10^{-2}$M), in dodecane medium (V=50 ml; T=29° C.), as a function of time (t in minutes), during the sonolysis (f=20 kHz; I=1.66 W.cm$^{-2}$), under a flow of argon (D=10 L.h$^{-1}$) (Example 3)
Figure 2B:
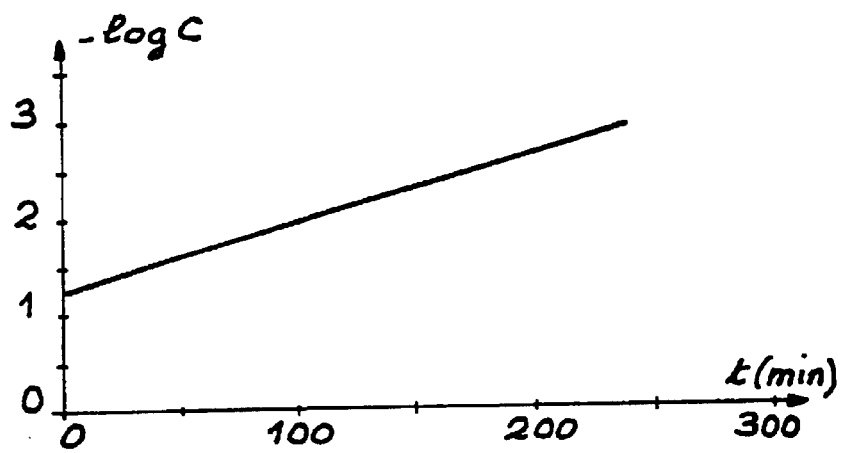
FIG. 2B is a graph in which the concentrations of FIG. 2A have been expressed in logarithmic form.

By way of example (FIG. 2), during sonolysis at 20 kHz (I=1.66 $W.cm^{-2}$; T=280° C.), the kinetic constant (first order) is $k=7.05 \times 10^{-3}$ $min^{-1}$, i.e. 99.8% of the t-$BuNO_2$ is removed after 4 hours.

Figure 3:
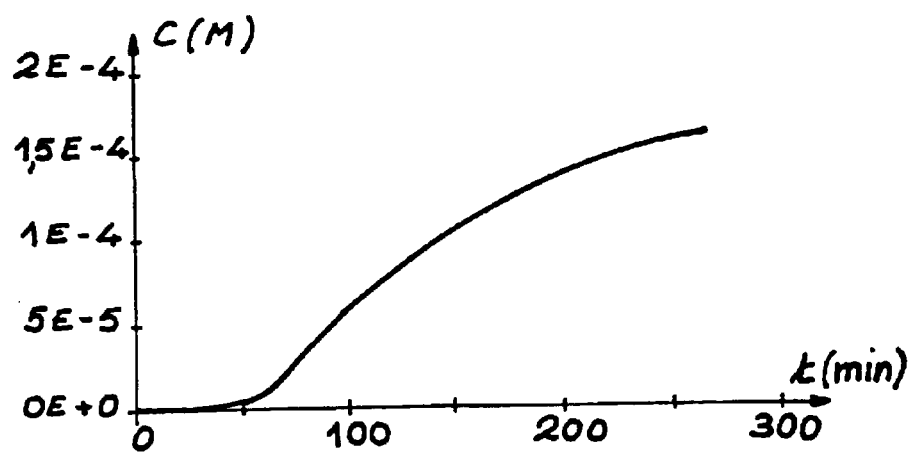
FIG. 3 is a graph which gives the variation of the concentration C (in M) of t-BuNO$_2$ evaporated without the effect of ultrasound under a flow of argon (D=10 L.h$^{-1}$) (Example 3).

Furthermore, it should be noted that only 6.4% of the amount of t-$BuNO_2$ removed is evaporated (b.p.=126° C.), and is found in the trap. These results are presented on the graph in FIG. 3, which gives the concentration C of t-$BuNO_2$ evaporated (M) as a function of time t (minutes).

Example 4
Removal of Dodecyl Nitrate ($C_{12}H_{25}ONO_2$)

To illustrate the ability of ultrasound to remove compounds with a high boiling point (about 220° C.), the case of dodecyl nitrate is developed more particularly.

For example, during the sonolysis (f=20 kHz; I=3.4 $W.cm^{-2}$; T=27 C., D (Ar)=150 $ml.min^{-1}$) of a solution of dodecyl nitrate (0.05 M) in TBP medium (V=50 ml), its rate of disappearance follows first-order kinetics. Under these conditions, the kinetic constant was evaluated as being about 0.00046 $min^{-1}$, i.e. a half-reaction time (removal of 50% of the initial amount of material) of 25 hours.

What is claimed is:

1. A process for selectively removing at least one functionalized organic compound present in a liquid medium, in which process a stream of vector gas is circulated in the liquid medium and the liquid medium is simultaneously subjected to the action of ultrasonic waves, whereby gaseous products produced by the combined action of the ultrasonic waves and the stream of vector gas are evacuated from the liquid medium by the stream of vector gas.

2. The process according to claim 1, in which the functionalized organic compound(s) has (have) a vapour pressure different from the vapour pressure of the majority constituent of the liquid medium.

3. The process according to claim 1, in which the ultrasound has a frequency from 15 kHz to 1.5 MHz.

4. The process according to claim 1, in which the acoustic intensity of the ultrasound is from 1 $W.cm^{-2}$ to 20 $W.cm^{-2}$.

5. The process according to claim 1, in which the flow rate of the stream of vector gas is from 10 to 600 $mL.min^{31}$ $^1$.

6. The process according to claim 1, in which the vector gas is chosen from rare gases, air and mixtures thereof.

7. The process according to claim 1, in which the temperature and pressure of the liquid medium are from 10 to 1 900° C. and from 1 to 10 bar, respectively.

8. The process according to claim 7, in which the pressure is atmospheric pressure and the temperature is ambient temperature.

9. The process according to claim 1, in which the said at least one functionalized organic compound comprises at least one atom chosen from nitrogen, oxygen, sulphur, phosphorus chlorine, bromine and iodine.

10. The process according to claim 3, in which the at least one functionalized organic compound comprises at least one functional group selected from the group consisting of carboxylic acid, sulphonic acid, phosphoric acid, anhydride, ester, acid halide, amide, nitrite, aldehyde, ketone, alcohol, thiol, amine, ether, organic nitrite, organic nitro and organic nitrate functions and halide functions.

11. The process according to claim 1, in which the liquid medium is a one-phase medium.

12. The process according to claim 1, in which the liquid medium is a multi-phase medium.

13. The process according to claim 11, in which the one-phase medium consists in an organic phase.

14. The process according to claim 12, in which the medium is a two-phase medium consisting in an organic phase and an aqueous phase.

15. The process according to claim 13 or claim 14, in which the organic phase essentially comprises an organic solvent.

16. The process according to claim 15, in which the organic solvent consists essentially of an extractant-diluent mixture, used in processes for reprocessing nuclear fuel or processes for cleaning, decontaminating nuclear plants.

17. The process according to claim 16, in which the extractant is chosen from alkyl phosphates.

18. The process according to claim 16, in which the diluent is chosen from alkanes.

19. The process according to claim 17, in which the extractant is selected from the group consisting of tributyl phosphate (TBP) and alkylamides.

20. The process according to claim 18, in which the diluent is selected from the group consisting of HTP, alcohols, carboxylic acids and dodecane.

* * * * *

UNITED STATES PATENT AND TRADEMARK OFFICE
CERTIFICATE OF CORRECTION

PATENT NO. : 6,913,699 B1
DATED : July 5, 2005
INVENTOR(S) : Philippe Moisy et al.

It is certified that error appears in the above-identified patent and that said Letters Patent is hereby corrected as shown below:

Title page,
Insert Item:
-- [73] Assignee:  Commissariat A L'Energie Atomique, Paris (FR)
    Compagnie Generable Des Matieres Nucleaires, Velizy Villacoublay, (FR) --.

Signed and Sealed this

Twentieth Day of September, 2005

JON W. DUDAS
*Director of the United States Patent and Trademark Office*